June 11, 1929.  W. H. G. GEAKE  1,716,547
COMBINED SEAM AND CLOSING CAP THEREFOR
Filed Oct. 28, 1926
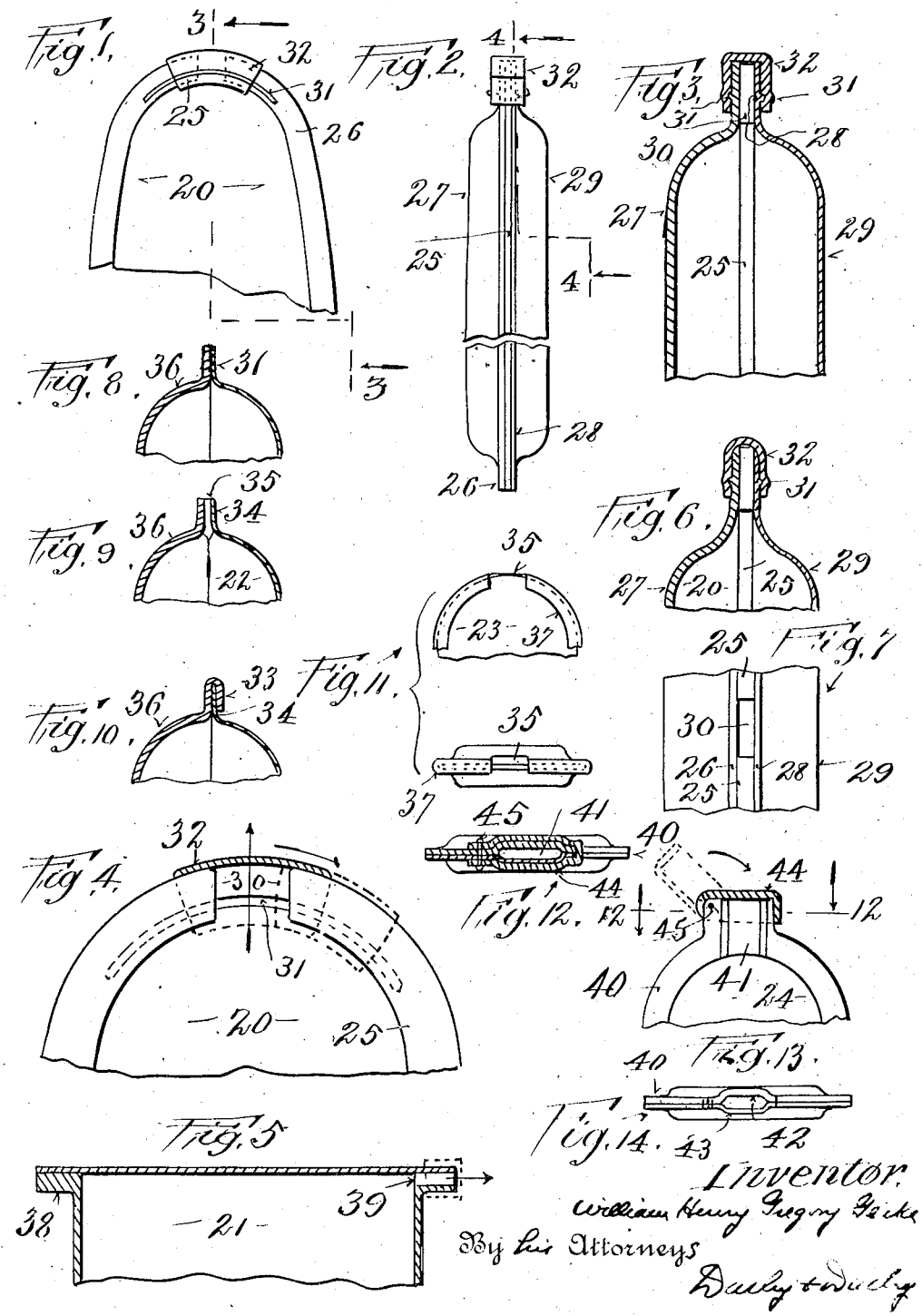

Patented June 11, 1929.

1,716,547

UNITED STATES PATENT OFFICE.

WILLIAM HENRY GREGORY GEAKE, OF KILLARA, SYDNEY, AUSTRALIA, ASSIGNOR TO C. A. GRIFFIS, INC., A CORPORATION OF NEW YORK.

COMBINED SEAM AND CLOSING CAP THEREFOR.

Application filed October 28, 1926. Serial No. 144,811.

This invention relates to seams for containers or distributing devices having an orifice through the seam for dispensing powders, plastics, pastes, granular material and the like.

The object of my invention includes the formation of a seam having depth to provide space for a suitable opening in the seam and closure for the opening.

Another object includes the formation of a simplified structure to provide for a dispensing orifice in containers or distributers which orifice structure requires special construction or fitting wherein the orifice is formed. I further provide a cap which, although relatively movable, cannot be lost or detached from the distributing device. My construction also provides a seam or union of two members with the orifice therethrough, which orifice forms a spout for ejecting materials therethrough.

A further object includes an apertured seam formation which is readily and cheaply made and which is applicable to containers or dispensing devices.

Other objects will appear hereinafter and I attain these objects by the construction illustrated in the accompanying drawing in which, Figure 1 is a plan view of a portion of a distributing container equipped with my invention.

Fig. 2 is a side elevational view of a container provided with my invention.

Fig. 3 is a sectional view taken on the line 3—3 of Fig. 1.

Fig. 4 is a view taken on the line 4—4 of Fig. 2.

Fig. 5 is a view showing the orifices through a thickened lip portion of the seam forming members.

Figs. 6 and 7 illustrate the use of a spacing member between the seam forming members to give depth to the seam.

Figs. 8 and 9 show the formation of a seam and orifice by bringing the flat faces of the seam forming plates together and forming a spout or opening.

Fig. 10 shows a modification wherein the seam is formed by the over-lapping of one edge of the material which forms the container.

Fig. 11 shows the manner of providing for an orifice in the over-lapping type of seam of Fig. 10 by cutting away a part of the over-lapping member.

Fig. 12 is a sectional view taken on the line 12—12 of Fig. 13 which is a view in elevation of a distributing device provided with a spout like orifice in a flat faced seam; and Fig. 14 is an end view thereof.

The same numerals refer to like parts where they appear in the several views.

It is the prime purpose of my invention to provide an efficient but cheap seam construction having a closable aperture, and which construction is useful for many purposes including the manufacture of containers and dispensing devices for pastes, plastic materials, granular or powdery substances, such as tooth powders and pastes, creams, soap preparations, lubricants, salts (sodium chlorid, medicinal salts and the like) and other granular or powdery substances and liquid or semi-liquid materials.

In the accompanying drawing I have shown my invention applied in specific instances to which however I do not desire to be limited unduly as various modifications falling wholly within the scope and spirit of my invention will suggest themselves to those versed in the art. In all cases, however, does the union of two surfaces form a seam which is provided with a dispensing orifice having, preferably, a cap or cover therefor. Where the invention is applied to dispensing devices in the form of containers, the union of the surfaces which form the seam may be effected in any desired manner, as by die-stamping and welding or soldering, by turning one edge of the surface over the adjacent member, or by the usual seamer well known to the art. The seam may be made in various ways typical examples of which are featured as follows:

(a) By providing a spacing member between the adjacent edges of the members which form the container and either omitting a part of the spacing member for the orifice, or, by forming the orifice in said member.

(b) By crimping and previously removing a portion of the seam forming edge or by forming the orifice through the seam.

(c) By thickening the edge of one or both container members and forming the orifice in the thickened edge or edges (herein to be known as the thickened lip).

(d) By shaping the material to form an orifice in the uniting edges which form the seam when the container forming members are brought together.

(e) By union of a thick member with a flexible member wherein the aperture may be formed in any of the types indicated under (a) (b) (c) or (d), or by simply depending upon the flexibility of the flexible member at the part where the companion member has been removed.

Referring now to the drawings for specific illustrative embodiments of my invention as applied to containers 20, 21, 22, 23 or 24, I provide in container 20, a spacing member or gasket 25 between the lip 26 of the upper or heavier and usually rigid member 27 and the thin lip 28 of the lower and preferably flexible member 29. The lips and spacing member are united to form the seam. In order to form the orifice 30, a portion of the spacing member 25 is cut away, preferably before assembling the parts. I also provide a bead 31 on the upper and lower lips on which slidingly fits the cap 32 for closing and opening said orifice.

(b) Where the seam is formed by crimping or ironing, usually, the upper edge 33 over the lip 34—to form the orifice 35, a portion of lip 33 is cut away preferably by stamping when the upper part 36 is formed. The turning (33) or the crimping (37) may be done by hand or by seamer.

(c) The lips may be thickened as at 38 and the orifice 39 formed therein (Fig. 5); or instead, both lips (for example 26 and 28) may be thickened to provide depth of the seam. In such cases the spacing gasket will be unnecessary.

(d) Where the material itself is shaped to form a flat faced seam 40, the orifice or spout 41 is formed in the seam flanges by the stampings 42 and 43. In this type of orificed seam I prefer to use a hinged cover 44 which is pivotally mounted on pin 45 or its equivalent.

Having now described my invention what I claim as new and useful and desire to receive by Letters Patent is:

1. An apertured seam construction for dispensing devices comprising lip members supplied with means for forming a seam having depth and having an orifice in the seam.

2. In a dispensing device, a pair of members of substantially equal dimensions but of unequal flexibility, means on one of said members to effect union with the other of said members to form a seam having an orifice therethrough and a covering for said orifice.

3. In a dispensing device, two members of substantially equal dimensions joined so as to form a seam and being permanently spaced apart at one portion to form an orifice and a closure for said orifice.

4. In a dispensing device, two members of substantially equal dimensions but of unequal flexibility joined so as to form a seam having depth, said members being permanently spaced apart at one portion of said seam to form an aperture in said seam and a cover for said aperture.

5. A seam construction for dispensing devices, comprising lip members, one of said members having an orifice therethrough, and means to hold permanently united said lip members all along the length of said lip members up to and exclusive of said orifice.

6. A dispensing container made up of a plurality of parts joined by a seam having an orifice therethrough, means for permanently joining said parts to form said seam throughout its length along the entire edge of said parts up to and exclusive of said orifice.

7. In a dispensing device, an upper member and a lower member, each of said members having a lip, the lip of one of said members encompassing the lip of the other of said members to form a seam having an orifice therethrough.

In testimony whereof I have hereunto set my hand on this 21st day of October, A. D. 1926.

WILLIAM HENRY GREGORY GEAKE.